United States Patent [19]

Neufeldt

[11] 4,103,790

[45] Aug. 1, 1978

[54] BUCKET ACTUATING LINKAGE

[76] Inventor: Jacob J. Neufeldt, Box 597, Lethbridge, Alberta, Canada, T1J 3Z4

[21] Appl. No.: 723,909

[22] Filed: Sep. 16, 1976

[51] Int. Cl.[2] ................................................ B60P 1/04

[52] U.S. Cl. ........................................ 214/80; 74/520; 214/83.3

[58] Field of Search ..................... 214/77 R, 75 R, 78, 214/80, 83.3, 302, 303; 74/516, 520

[56] References Cited

U.S. PATENT DOCUMENTS

| | | | |
|---|---|---|---|
| 3,135,440 | 6/1964 | Baran | 74/520 |
| 3,539,061 | 11/1970 | Burgess | 214/83.3 |
| 3,625,380 | 12/1971 | Anderson | 214/77 R |
| 3,709,388 | 1/1973 | Neufeldt | 214/83.3 |
| 3,949,624 | 4/1976 | Bienert | 74/520 |

FOREIGN PATENT DOCUMENTS

| | | | |
|---|---|---|---|
| 849,906 | 8/1970 | Canada | 214/77 R |

*Primary Examiner*—Robert G. Sheridan
*Assistant Examiner*—Ross Weaver
*Attorney, Agent, or Firm*—Alex E. MacRae

[57] ABSTRACT

An improved actuating mechanism for the bucket assembly of a refuse vehicle includes a variable torque applying linkage connected to a hydraulic cylinder wherein the linkage is comprised of a crankarm fixed to a rotatable shaft, on which the bucket assembly is mounted, and a connecting link which has one end connected to the crankarm and its other end connected to the piston rod of the hydraulic cylinder. The linkage is connected in such a manner that the link functions both as a two force and a three force member during a complete cycle of operation, and in so doing, is operable to change the moment arm of the force applied by the cylinder which, in turn, varies the torque applied to the shaft; the greatest torque being applied during a compression stroke of the bucket assembly.

16 Claims, 9 Drawing Figures

BUCKET ACTUATING LINKAGE

INTRODUCTION AND DISCUSSION OF PRIOR ART

This invention relates to a bucket actuating apparatus for a self-loading vehicle such as a refuse vehicle.

This invention is an improvement over the invention disclosed and claimed in my U.S. Pat. No. 3,709,388, entitled "Side-Loading Refuse Vehicle", issued on Jan. 9, 1973 to the present inventor. There is disclosed therein a refuse vehicle having a side loading bucket assembly mounted for rotation on a shaft which extends longitudinally of the vehicle. The bucket is filled in a lower material receiving position, and, when filled, it is raised by rotation of the shaft to a position where its contents are emptied into the body of the vehicle. The bucket undergoes further rotation to compress the contents in the body. For most efficient operation, the assembly requires in the neighbourhood of 230° of angular displacement.

To drive the bucket assembly, the patented structure uses a pulley fixed to one end of the shaft around which a cable is led. The cable passes over further movable pulleys, which are connected to a hydraulic cylinder, and its ends are fixed to the vehicle body. Actuation of the hydraulic cylinder will cause the shaft to rotate as a result of frictional engagement between the cable and the pulley fixed to the end of the shaft.

It is apparent that although this arrangement operates in a satisfactory manner, there are disadvantages, the most obvious being its complexity. The arrangement has a fair number of movable parts and requires a number of anchoring points for idler pulleys and the cable ends.

SUMMARY OF THE INVENTION

The present invention is directed to a drive linkage for actuating a shaft which is much more simple in nature than existing refuse vehicle bucket actuating mechanisms. The linkage is not only designed for simplicity, but it is also designed to transmit a variable torque in response to a substantially constant force input from a hydraulic cylinder. Particularly, the linkage is capable of transferring a larger torque to the shaft during the compression stroke of the bucket than during the lifting or return strokes.

In accordance with the present invention, there is provided a drive linkage for applying a torque to a shaft which supports a bucket assembly in a self-loading refuse vehicle, the assembly having a lifting stroke, a compression stroke and a return stroke, a motor for actuating the linkage, whereby the linkage serves to apply a larger torque to the shaft during the compression stroke than during the lifting or return strokes.

BRIEF DESCRIPTION OF THE DRAWINGS

These and other features of the invention will become clear in the description of a preferred embodiment of the invention which follows wherein reference is made to the following drawings.

DETAILED DESCRIPTION

Figure 1:
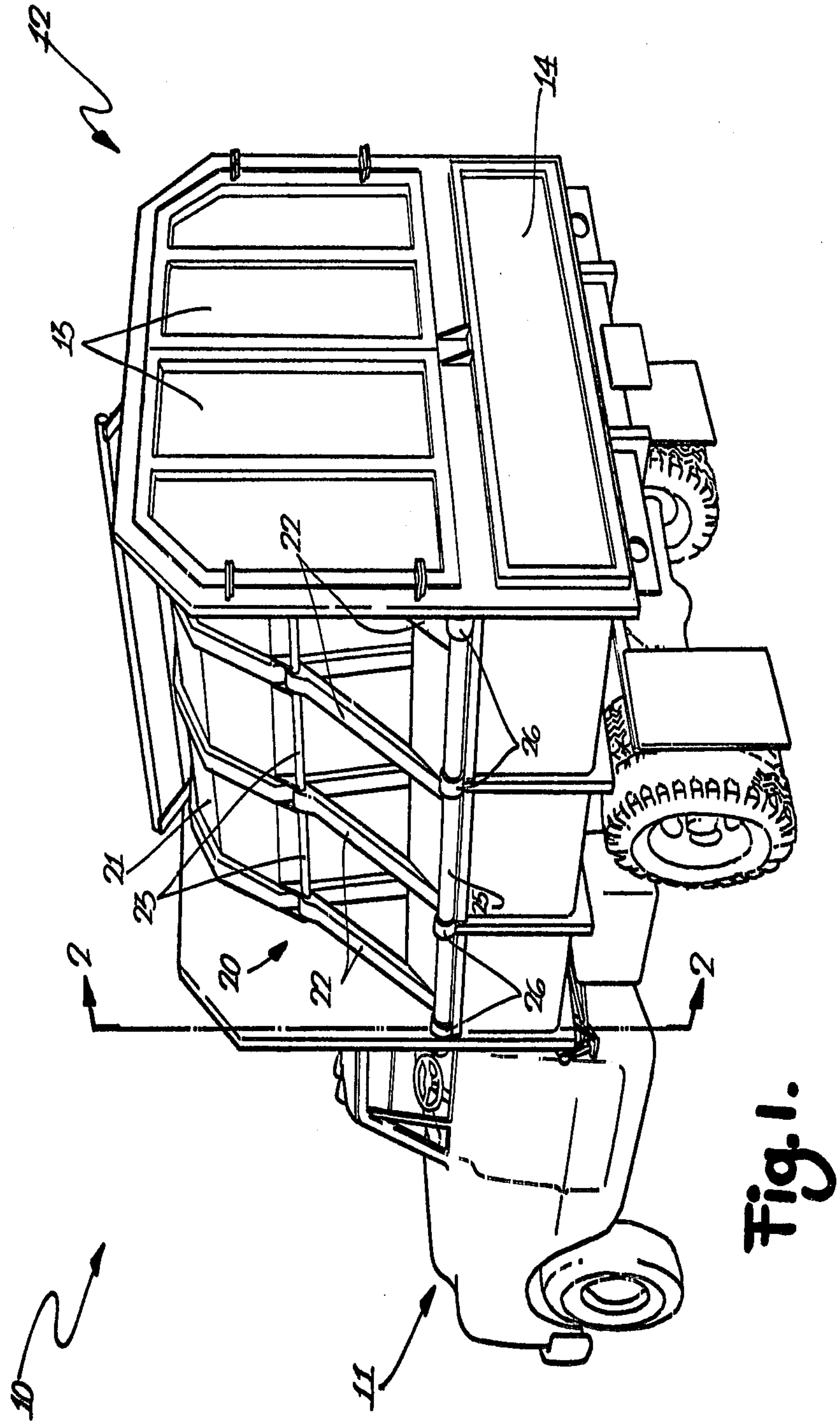
FIG. 1 is a perspective view of a side loading refuse vehicle.

With reference, now, to FIG. 1 of the drawings, reference numeral 10 generally designates a self-loading vehicle, having a cab 11 and body 12. Body 12 is adapted to receive and store refuse or the like and is tiltable in the usual manner by conventional hydraulic cylinders (not shown). It is provided with doors 13 and tailgate 14 at the back end thereof through which the refuse is discharged.

Mounted at one side of body 12 is a bucket assembly 20 which includes a bucket 21 and a plurality of articulated arms 22. As best shown in FIG. 1, bucket 21 is mounted for pivotal movement at one end of each arm 22 by pivot pins 23. The other ends of arms 22 are fixedly secured, by welding, to a shaft 25 which extends longitudinally of the vehicle and which is mounted for rotation in bearing blocks 26.

Bucket 21 is formed with a spring biased pin 28 which extends longitudinally away from the bucket at one end thereof. The pin is adapted to cooperate, during the compacting stroke, with a cam groove 29 formed on the inside wall of body 12. Groove 29 includes a horizontal portion 30 and an upwardly inclined portion 31. Alternatively, groove 29 could be an upwardly directed arcuate depression in the wall of body 12. Cooperation between pin 28 and groove 29 results in rotation of bucket 21 about pins 23 as arms 22 are angularly advanced in the counterclockwise direction as viewed in FIG. 2.

Figure 2:
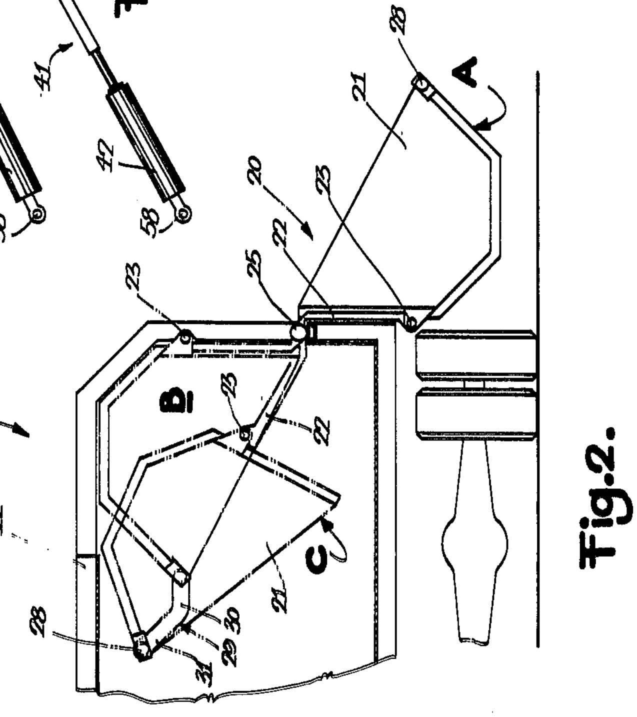
FIG. 2 is a cross-sectional view taken along line 2—2 of FIG. 1 showing the bucket assembly operating strokes.

The description which follows will refer for simplicity to three bucket positions, identified by the letters A, B and C in FIG. 2. Position A is intended to signify the normal refuse receiving position of the bucket. From this position and during its advancement to position B, bucket 21 is held releasably secured to arms 22 by a releasable bucket securing means 60 to be described later. Position B is the position at which the contents of bucket 21 are emptied into body 12, pin 28 engages groove 29 and means 60 frees bucket 21 for pivotal movement relative to arms 22. Position C signifies the innermost or terminal position of the bucket.

Once bucket 21 has been adequately filled at position A, a bucket actuating mechanism will pivot shaft 25 in a counterclockwise direction when viewing FIG. 2 and carry with it bucket 21. As mentioned earlier, between positions A and B, bucket 21 is held releasably secured by means 60 to arms 22 in such a manner that the bucket is prevented from pivoting about pins 23 in a clockwise direction relative to arms 22. Upon reaching position B, the contents of the bucket will have been deposited, means 60 released, and pin 28 engaged with groove 29. With further advancement of the bucket, pin 28 will follow cam groove 29 and cause the lower edge of bucket 21 to move inwardly of body 12 relative the upper edge and, in so doing, the contents of body 12 will be compressed. After reaching position C the actuating mechanism will be reversed and will return bucket 21 to position B or A along the path just described.

From the foregoing, it becomes apparent that the bucket assembly requires essentially three strokes for successful operation. The first or lifting stroke consists of rotation through 180° from material receiving position A, to material discharge position B. The second stroke is a material compacting stroke which requires approximately a further 45° of rotation. The third and final stroke is a return stroke which consists essentially of rotation in the opposite direction to either position A where the bucket may be refilled or to position B, where the assembly is positioned when not in use.

It can be readily seen, then, that the bucket assembly actuating apparatus must be capable of pivoting shaft 25 through an angular displacement of approximately 225°, and back to position A or B. Such an apparatus forms the basis of the present invention and is described below with reference to FIGS. 3, 4, 5, and 6.

Figure 4:
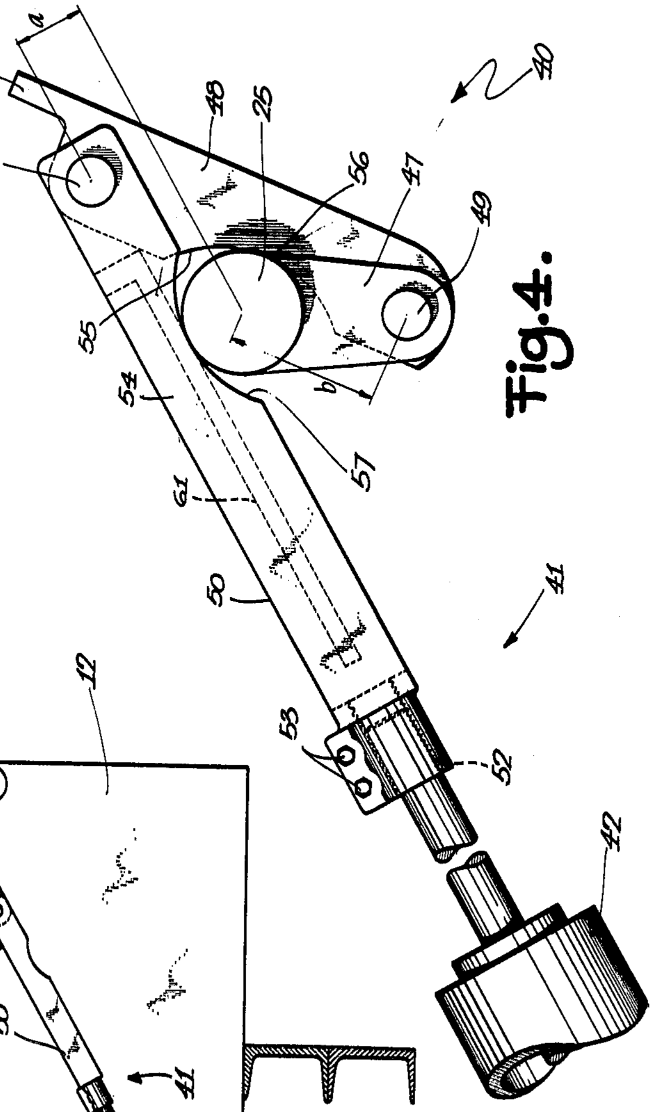
FIG. 4 is an enlarged view of the drive linkage.
Figure 3:
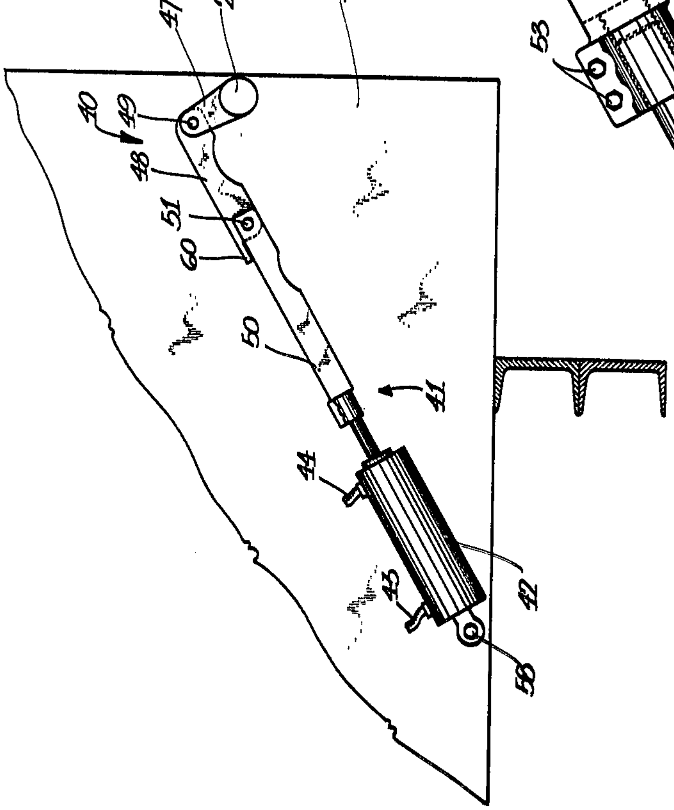
FIG. 3 is a view of the drive linkage in accordance with a preferred form of the invention.

FIG. 3 shows a variable torque applying linkage 40 connected to a piston rod assembly 41 of a conventional hydraulic motor or cylinder 42. Motor 42 includes a pair of fluid inlet and outlet hoses 43 and 44, respectively. The variable torque applying linkage 40 includes a bifurcated crankarm 47 and a connecting link 48. Crankarm 47 and one end of link 48 are connected together for relative pivotal movement by a pin 49. The other end of link 48 is pivotally connected to a piston rod extension 50 by a pin 51. Extension 50 is a bifurcated member having two side walls 54 connected by a web 61. Extension 50 is removably secured to the piston rod by mating screw threads 52, as well as, by bolts 53. In the particular orientation of the various elements in FIG. 3, the bucket assembly has passed position B and is, in its compacting stroke. FIG. 4, which is drawn on a larger scale to more clearly illustrate the various elements, shows the linkage 40 in such a position that the bucket is in its material receiving position A. This position is identified by crankarm 47 extending vertically downwardly of shaft 25.

Connecting link 48 has a dual function. During the lifting stroke, it functions as a lever, whereas, during the compacting and return strokes, it functions as a two force member. A two force member is a member which carries only axial forces. In connection with its function as a lever, it can be seen, in FIG. 4, that intermediate its pivotal connections 49 and 51 there is formed a recess 55 which cooperates, by direct contact with shaft 25, to establish a fulcrum point 56. As a result, when piston rod assembly 41 is retracted, a force will be transmitted through extension 50 and pin 51 to link 48, and due to fulcrum 56, the force will then be transmitted to crankarm 47 through pin 49 in a counterclockwise direction (FIG. 4).

The force transferred from cylinder 42 acts axially along piston rod assembly 41. This force acts over a moment arm of length "*a*". It can be seen that as shaft 25 rotates in a counterclockwise direction the moment arm "*a*" will increase. The force applied to crankarm 47 acts in a direction perpendicular to the line joining the centres of pins 49 and 51 and with a moment arm of length "*b*".

With reference to FIG. 2, it is apparent that the largest lifting torque requirement during the lifting stroke will exist when the bucket assembly 21 has rotated through about 90° from position A in the counterclockwise direction, since the effective moment arm of the load is at its greatest value. The linkage is designed so that the moment arm "*a*" will be at its maximum value at this position to provide a higher torque.

Figure 5:
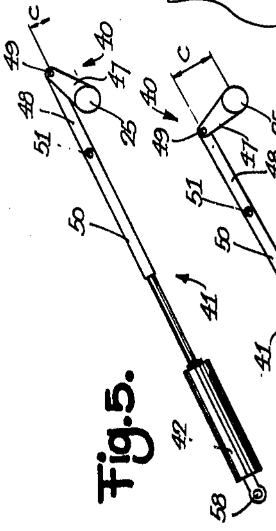
FIGS. 5 and 6 are schematic views of the linkage illustrating specific points of operation.
Figure 6:
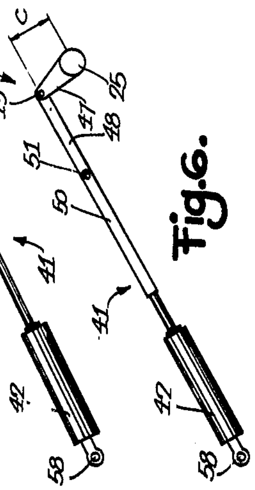

A position will be reached where link 48 will become disengaged from shaft 25. This position is shown in FIG. 5, diagrammatically. In this position, link 48 and piston rod assembly 50 will be aligned, and the effective moment arm "*c*" will determine the torque applied to the shaft. As shaft 25 continues to rotate, it is apparent that moment arm "*c*" will increase to a maximum value determined by the distance from the centre of pin 49 to the centre of shaft 25. It can be further seen, in FIG. 6, that at the point of maximum torque, shaft 25 has undergone an angular displacement in excess of 180° and, in particular, it has rotated in the neighbourhood of 225° – 230°.

Once the compacting stroke has been completed, the fluid flow into cylinder 42 is reversed, thus the linkage is relieved of its tensile forces, and the linkage together with cylinder 42 buckles downwardly under its own weight. In particular, pin 51 is allowed to sag or buckle below a line joining the centre of pin 49 and the centre of pin 58 about which cylinder 42 may pivot. The sag or buckling is permitted to the extent of about half an inch and limited thereto by engagement between a projection 60 formed on link 48 and web 61 of extension 50. This results in an overcentre lock. A compressive force may now be applied to the linkage without fear of further buckling and the bucket assembly may be returned to either position A or B.

Figure 7:
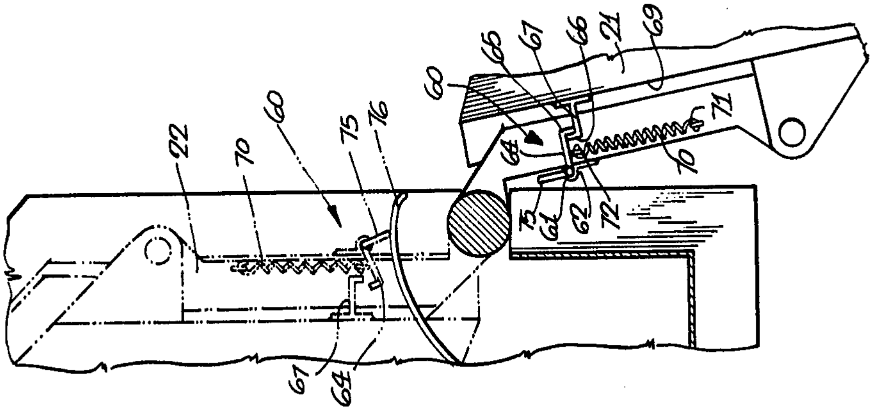
FIG. 7 is a cross-sectional view taken along line 7—7 of FIG. 8, but showing the bucket in its lower position in solid lines, showing a preferred bucket lock and release mechanism.
Figure 8:
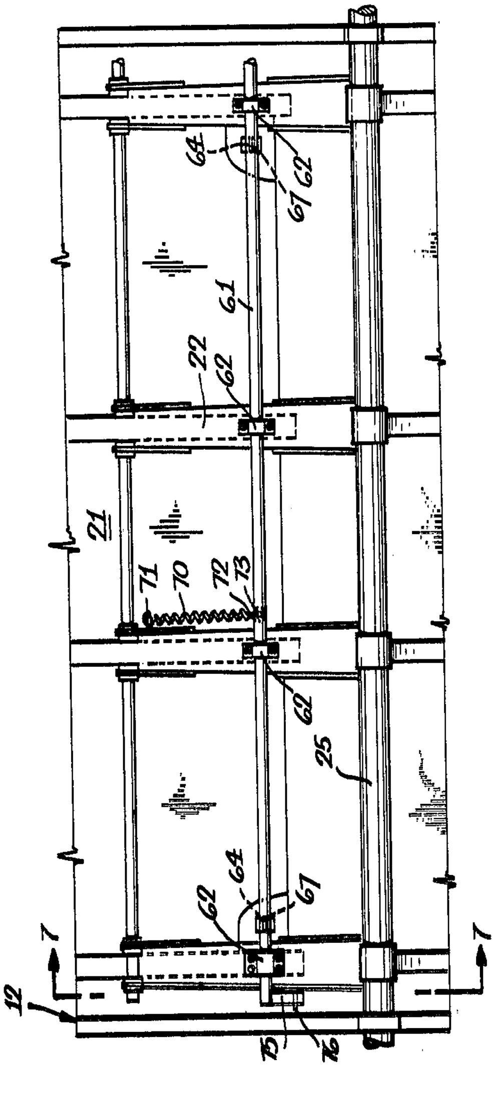
FIG. 8 is a partially broken elevational view of the side of the vehicle showing the bucket in a raised position and showing the preferred bucket lock and release mechanism.

The preferred bucket lock and release means 60 will now be described with reference to FIGS. 7 and 8. Means 60 includes a shaft 61 pivotally journalled in bearing units 62 secured to arms 22. Secured to shaft 61 is at least one latch member 64 having a hook portion 65 which is adapted to matingly engage hook portion 66 of bucket latch member 67 fixed to wall 69 of bucket 21. A tension spring 70 is provided to bias latch member 64 into locking engagement with latch member 67 as shown in FIG. 7. One end 71 of spring 70 is connected to arm 22 while the other end 72 is connected to a projecting finger 73 weldingly secured to shaft 61. To the forward most end of shaft 61, there is provided a trip rider 75 which is adapted to engage a trip rail 76 secured to the inner end wall of body 12. Trip rail 76 is so positioned that as bucket 21 approaches position B from position A rider 75 will engage the trip rail and will be caused to pivot in a counterclockwise direction. In so doing, shaft 61 will pivot and hook portions 65 and 66 of latch members 64 and 67, respectively, will be disengaged. It will be noted that the disengagement occurs at a position where the load upon the latch members is at a minimum and, accordingly, the rail and latch members are subjected to little stress during disengagement. Thus, means 60 provides a simple yet effective means of releasably locking bucket 21 in position during the lifting stroke.

Figure 9:
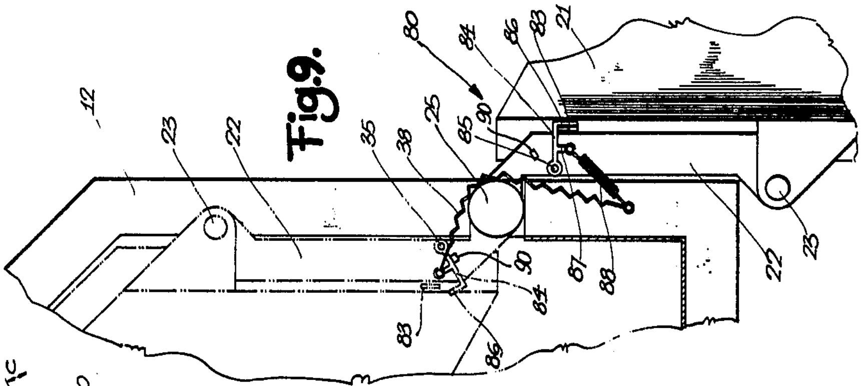
FIG. 9 is a view of an alternative embodiment of the bucket lock and release mechanism.

An alternative bucket lock and release means 80 is shown in FIG. 9 to prevent rotation of the bucket about pins 23. It includes a projection 83 fixed to bucket 21 and a latch 84 mounted for pivotal movement about a pin 85 fixed to one of the arms 22. Latch 84 is formed with a lip 86 which is adapted to lockingly engage projection 83 and a lug 87 which is connected to one end of a spring 88. Spring 88 has its other end connected to a non-movable member of the vehicle such as body 12. Spring 88 is the means by which latch 84 is removed from locking engagement with projection 83, and does so in the manner now to be described.

Spring 88 maintains engagement between projection 83 and lip 86 by exerting a biasing force on latch 84 in the clockwise direction about pin 85. When actuated, shaft 25 will pivot to move the bucket from position A to a position B shown in dotted and dashed lines in FIG. 9. As a result, the bucket will tend to pivot in a counterclockwise direction about pins 23, while pivoting from A to B, spring 88 will have been expanded and partially wrapped about shaft 25, as shown. The line of force of spring 88 will have moved to the other side of pin 85 thereby exerting a force on latch 84 tending to rotate the same in a counterclockwise direction. This force being unresisted will allow latch 84 to move out of engagement with projection 88 and, in so doing, the bucket will be free to pivot about pins 23. A stop 90 prevents excessive rotation of latch 84 and holds the latch in position awaiting return of the bucket from its compacting stroke. Spring 88 would preferably be encased in a rubber like sleeve to minimize wear.

While the invention has been described in relation to a side mounted loading bucket, it will be appreciated that the bucket could be mounted at the forward end of body 12 and have a pivotal axis which extends transversely with respect to the vehicle without departing from the spirit of the invention. It will also be understood that two separate bucket actuating mechanisms could be provided, one at each end of the bucket.

The linkage 40 was designed with a view to compactness. This is particularly evident by the provision of recess 55 in link 48. For similar reasons a recess 57 is formed in extension 50.

It can be seen from the foregoing, then, that there is provided a simple and compact drive linkage for actuating a bucket assembly of a refuse vehicle where the linkage is capable of varying the applied torque to meet varying load torque demands during the lifting and compacting strokes of the bucket assembly. It should also be apparent that various modifications may be made to the drive linkage without departing from the spirit of the invention as defined by the appended claims.

What I claim as my invention:

1. In combination, a bucket for a self-loading refuse vehicle, said bucket operatively connected to a shaft for rotation therewith about an axis, and a linkage means for applying torque to said shaft, such shaft and bucket being movable through a lifting stroke between a lower position for loading, a raised position for unloading and through a compacting stroke to a further position for compacting wherein the shaft is turned beyond the raised position, and through a return stroke back to said lower position, said drive linkage means including a plurality of interconnected links, said linkage means connected to the vehicle and to the said shaft and operable, upon powered actuation thereof, to transmit the force of the power actuation to exert a torque on the said shaft to move the bucket through said lift stroke from said lower position to said raised position and then through the compacting stroke to said further position, said drive linkage means including means for exerting on the shaft, during said lifting stroke, the greatest torque at about halfway between the lower and raised positions, and including means for exerting on the shaft during the compacting stroke a further torque which is greater than the said torque about halfway through the lifting stroke.

2. The apparatus of claim 1, further including means for maintaining a portion of said linkage means in an aligned state during part of said return stroke to prevent buckling thereof.

3. The apparatus of claim 1, including a power means connected to the linkage means and wherein said plurality of links connecting said shaft to said power means are operable to provide essentially 180° rotation of said shaft from the lower position to the raised position.

4. The apparatus of claim 3, said links including a crankarm fixed to said shaft and a connecting link having one end pivotally connected to said crankarm and its other end pivotally connected to a piston rod assembly of said motor.

5. The apparatus of claim 4, further including a piston rod extension connecting said piston rod and said connecting link, said link having a projection which is cooperable with said extension to maintain said connecting link and extension in a substantially aligned state during the return stroke of said bucket to prevent buckling between said connecting link and extension.

6. The apparatus of claim 5, wherein said extension and connecting link are pivotally connected together.

7. The apparatus of claim 1, said linkage including a crankarm fixed to said shaft, a connecting link having one end pivotally connected to said crankarm and its other end connected to a piston rod assembly of a power means, wherein during a portion of said operating cycle, said connecting link is a three force member and during the remainder of said cycle, said connecting link is a two force member.

8. The apparatus of claim 7, said connecting link further having a fulcrum point intermediate its pivotal connections during a portion of said lifting stroke to provide a variable moment arm during said portion of said stroke.

9. The apparatus of claim 7, further including locking means preventing buckling of said linkage during the return stroke of said bucket assembly.

10. The apparatus of claim 9, wherein said locking means is an overcentre locking cooperation between a projection formed on said link and said piston rod assembly.

11. The apparatus of claim 7, wherein the torque applied to said shaft is varied in use by variation of the moment arm of the force applied by said motor to said linkage.

12. The apparatus of claim 7, wherein said connecting link is a lever during said lifting stroke and is a tension member during said compacting stroke.

13. The apparatus of claim 7, wherein said piston rod assembly includes a piston rod and a linkage yoke, said yoke having one end fixed to said piston rod and its other end pivotally connected to said connecting link.

14. In combination, a bucket for a self-loading refuse vehicle, said bucket operatively connected to a shaft for rotation about an axis, and a linkage means for applying torque to the shaft, said shaft and bucket being movable through a lifting stroke between a lower position for loading, a raised position for unloading and through a compacting stroke for compacting wherein the shaft is turned beyond the raised position, and through a return stroke back to the lower position, a power means connected to the vehicle and including a reciprocable piston rod assembly with an extension extending therefrom, a connecting link pivotally connected to the extension of the piston rod assembly, and a crankarm pivotally connected to the connecting link and fixed to the shaft, said links being operatively connected to the power means and to each other to vary the moment arm of said applied force of the power means on the shaft so that the maximum torque is applied on the shaft during the compacting stroke, wherein during the lifting stroke the moment arm of the force between the power means and the shaft increases and then decreases so that the greatest moment arm, and hence the greatest torque, is present approximately halfway through the lifting stroke, said torque halfway through the lifting stroke being less than that existing during the compacting stroke.

15. The apparatus of claim 14, wherein said connecting link is formed with a projection for cooperation with said extension to prevent buckling of said linkage during the return stroke of said bucket assembly.

16. In combination, a bucket for a self-loading refuse vehicle and a drive linkage therefor, said bucket being mounted on a shaft and movable between a lower position for loading, a raised position approximately 180° from the lower position for unloading, and a further position beyond the raised position for compacting, a power means connected to the vehicle, said power means including a piston rod assembly with an extension fixed thereto, a connecting link pivotally connected to the extension, and a crankarm pivotally connected to the connecting link and fixed to the shaft, said extension, connecting link and crankarm being arranged such that in the lower position the connecting link forms an acute angle with the extension and engages on its side the said shaft, and the crankarm forms an acute angle with the connecting link; and in the further position the extension and the connecting link are essentially aligned with each other and generally perpendicular to the crankarm, whereby, within the 180° between the lower position and the raised position, the greatest moment arm and hence the greatest torque is exerted from the power means on the shaft at about 90° of rotation from the lower position to the raised position, and whereby a still greater moment arm is present and hence a still greater torque is exerted on the shaft at said further position.

* * * * *